(12) United States Patent
Hoover

(10) Patent No.: US 10,272,851 B2
(45) Date of Patent: Apr. 30, 2019

(54) VEHICLE EMBLEM ALIGNMENT AND INSTALLATION TOOLS AND METHODS OF USE

(71) Applicant: Toyota Motor Engineering & Manufacturing North America, Inc., Erlanger, KY (US)

(72) Inventor: Jeffrey R. Hoover, Georgetown, KY (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 517 days.

(21) Appl. No.: 14/878,352

(22) Filed: Oct. 8, 2015

(65) Prior Publication Data

US 2017/0101064 A1 Apr. 13, 2017

(51) Int. Cl.
*B60R 13/00* (2006.01)
*B62D 65/02* (2006.01)

(52) U.S. Cl.
CPC ............ *B60R 13/005* (2013.01); *B62D 65/02* (2013.01)

(58) Field of Classification Search
CPC ....... B60R 13/005; B60R 13/00; B62D 65/02; B62D 65/026; B62D 65/16; G01B 11/27
See application file for complete search history.

(56) References Cited

U.S. PATENT DOCUMENTS

| | | | | | |
|---|---|---|---|---|---|
| 4,691,457 | A | * | 9/1987 | Peroni | G09F 21/045 40/1.5 |
| 5,067,265 | A | * | 11/1991 | Harms | A44C 3/001 24/703.1 |
| 5,380,978 | A | * | 1/1995 | Pryor | B23K 26/032 219/121.64 |
| 5,588,216 | A | * | 12/1996 | Rank | G01B 11/27 33/286 |
| 5,987,726 | A | * | 11/1999 | Akeel | B23P 19/105 29/407.08 |

(Continued)

FOREIGN PATENT DOCUMENTS

| | | |
|---|---|---|
| CN | 20293751 | 5/2013 |
| EP | 0015591 | 9/1980 |

*Primary Examiner* — Ryan J. Walters
*Assistant Examiner* — Lawrence Averick
(74) *Attorney, Agent, or Firm* — Dinsmore & Shohl LLP

(57) ABSTRACT

Methods and systems for installation and alignment of a vehicle emblem on a body panel assembly include a tool including an outer handling side facing an operator and an inner alignment side facing the body panel assembly. The inner alignment side includes an inner facing surface and an emblem holding volume that is sized and shaped to receive the vehicle emblem therein, the inner alignment side further includes an alignment ridge extending outwardly therefrom that together with the inner facing surface defines a panel receiving volume. A first and second sensor assembly may include vehicle panel detectors respectively aligned with perpendicular first and second axes. The first sensor assembly and the second sensor assembly are arranged to concurrently provide an indication of alignment with the body panel assembly of the vehicle with a datum surface of the body panel assembly engaged by the alignment ridge in a predetermined orientation.

14 Claims, 8 Drawing Sheets

(56) References Cited

U.S. PATENT DOCUMENTS

| | | | | |
|---|---|---|---|---|
| 6,106,912 A * | 8/2000 | Balog | B60R 13/005 | 280/727 |
| 6,109,840 A * | 8/2000 | Raiteri | B23Q 3/186 | 269/309 |
| 7,200,516 B1 * | 4/2007 | Cowley | B23B 49/00 | 356/138 |
| 7,763,332 B2 * | 7/2010 | Denet | B60R 11/00 | 280/727 |
| 8,623,485 B2 | 1/2014 | Asano et al. | | |
| 8,954,183 B2 * | 2/2015 | Kayani | B23K 26/03 | 700/114 |
| 8,955,244 B2 * | 2/2015 | Osiecki | B60R 13/005 | 40/591 |
| 9,032,609 B2 * | 5/2015 | Kilibarda | B62D 65/026 | 29/559 |
| 9,261,800 B2 * | 2/2016 | de Boer | G03F 7/70775 | |
| 9,511,496 B2 * | 12/2016 | Sarh | B25J 9/1697 | |
| 9,513,230 B2 * | 12/2016 | Gerling | G01B 7/28 | |
| 9,573,269 B2 * | 2/2017 | Albert | B25H 1/0057 | |
| 10,042,155 B2 * | 8/2018 | Arbouzov | G02B 23/14 | |
| 2002/0021959 A1 * | 2/2002 | Schauer | B23Q 3/186 | 414/744.2 |
| 2003/0019090 A1 * | 1/2003 | Matsumoto | B62D 65/02 | 29/428 |
| 2003/0060922 A1 * | 3/2003 | Schauer | B23Q 3/186 | 700/213 |
| 2003/0082318 A1 * | 5/2003 | Jacobs | B44C 5/005 | 428/31 |
| 2003/0083776 A1 * | 5/2003 | Schauer | B23Q 3/186 | 700/218 |
| 2004/0103529 A1 * | 6/2004 | Kline | B62D 65/02 | 29/822 |
| 2004/0143951 A1 * | 7/2004 | Berninger | B23K 37/0435 | 29/428 |
| 2004/0174042 A1 * | 9/2004 | Izabel | B60J 5/101 | 296/146.8 |
| 2005/0007578 A1 * | 1/2005 | Ziemins | G01B 11/27 | 356/153 |
| 2005/0081398 A1 * | 4/2005 | Sun | G01D 11/30 | 33/645 |
| 2006/0167587 A1 * | 7/2006 | Read | B23Q 9/00 | 700/245 |
| 2006/0176710 A1 * | 8/2006 | Meinke | B60Q 1/2669 | 362/503 |
| 2006/0215175 A1 * | 9/2006 | Yacoubian | G01N 21/1717 | 356/502 |
| 2007/0017081 A1 * | 1/2007 | Becker | B25J 9/1684 | 29/429 |
| 2007/0106457 A1 * | 5/2007 | Rosenberg | G01C 17/00 | 701/532 |
| 2007/0260420 A1 * | 11/2007 | Johnson | G01B 21/042 | 702/152 |
| 2008/0005874 A1 * | 1/2008 | Keller | B60R 13/005 | 24/458 |
| 2008/0068857 A1 * | 3/2008 | Meinke | B60Q 1/2669 | 362/546 |
| 2008/0104815 A1 * | 5/2008 | Kussmaul | B25H 3/00 | 29/407.01 |
| 2008/0305283 A1 * | 12/2008 | Denet | B60R 11/00 | 428/31 |
| 2009/0000170 A1 * | 1/2009 | Capuzzi | B60R 13/005 | 40/643 |
| 2009/0002325 A1 * | 1/2009 | Jha | G06F 3/016 | 345/173 |
| 2009/0257241 A1 * | 10/2009 | Meinke | B60Q 1/2669 | 362/546 |
| 2009/0317221 A1 * | 12/2009 | Hawes | B25J 15/0028 | 414/618 |
| 2010/0058632 A1 * | 3/2010 | Love | G09F 21/04 | 40/591 |
| 2010/0298963 A1 * | 11/2010 | Boehm | B25J 9/1697 | 700/108 |
| 2011/0059271 A1 * | 3/2011 | Custer | B60R 13/00 | 428/31 |
| 2011/0070446 A1 * | 3/2011 | Denet | B60R 11/00 | 428/411.1 |
| 2012/0313392 A1 * | 12/2012 | Bingle | B60R 13/005 | 296/1.08 |
| 2013/0082169 A1 * | 4/2013 | Kilibarda | B62D 65/026 | 250/222.1 |
| 2013/0215271 A1 * | 8/2013 | Lu | H04N 7/18 | 348/148 |
| 2014/0000921 A1 * | 1/2014 | Vanko | G01C 9/00 | 173/11 |
| 2014/0167342 A1 * | 6/2014 | Jin | B23P 21/00 | 269/27 |
| 2014/0196332 A1 * | 7/2014 | Osiecki | B60R 13/005 | 40/600 |
| 2015/0158371 A1 * | 6/2015 | Jin | B25J 9/1687 | 29/709 |
| 2015/0316761 A1 * | 11/2015 | Williams | G02B 7/1827 | 359/221.4 |
| 2016/0256995 A1 * | 9/2016 | Albert | B25H 1/0057 | |
| 2017/0097574 A1 * | 4/2017 | Goodwin | G03F 7/70141 | |
| 2017/0168475 A1 * | 6/2017 | Choi | B62D 65/024 | |
| 2017/0240100 A1 * | 8/2017 | Salter | H05B 37/0281 | |
| 2018/0015973 A1 * | 1/2018 | Nanba | B62D 65/028 | |

\* cited by examiner

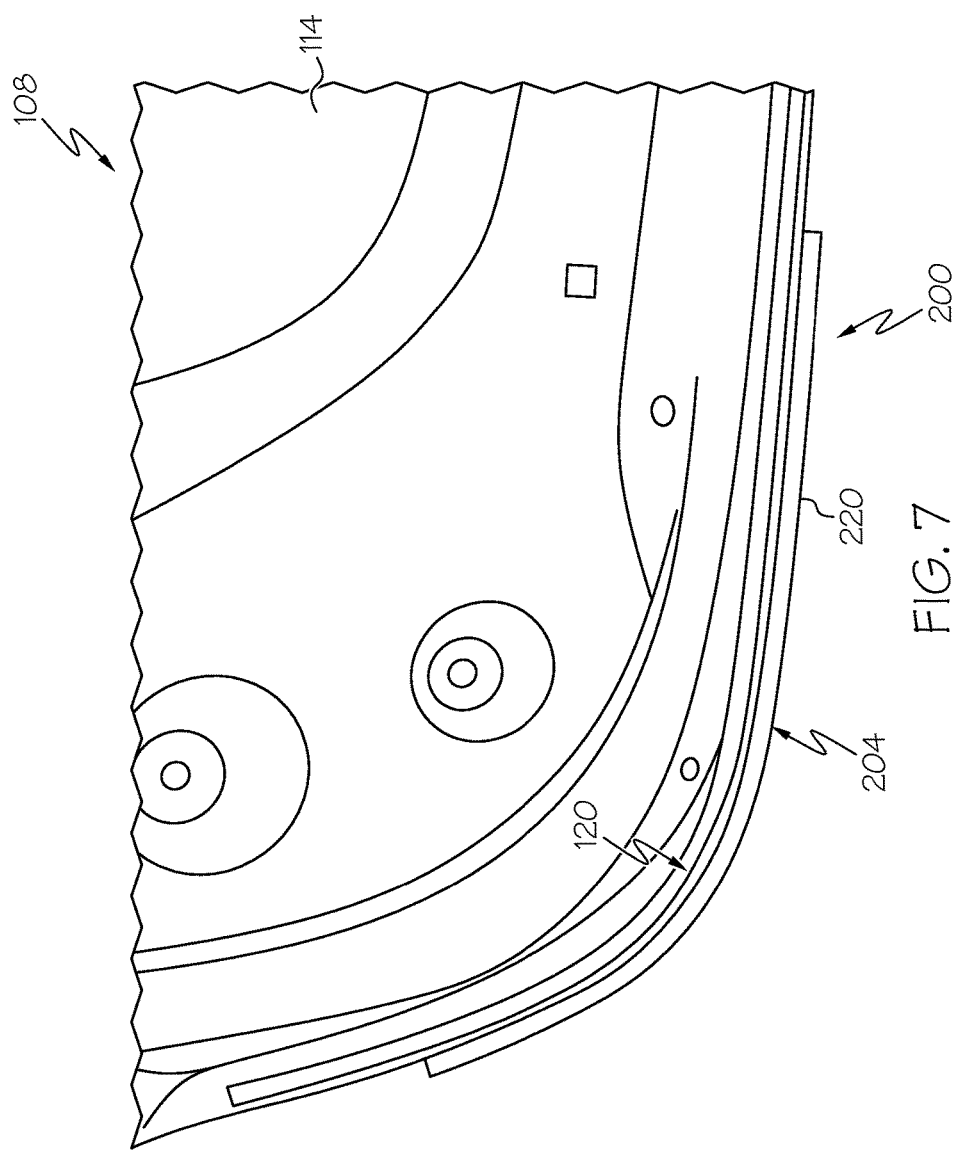

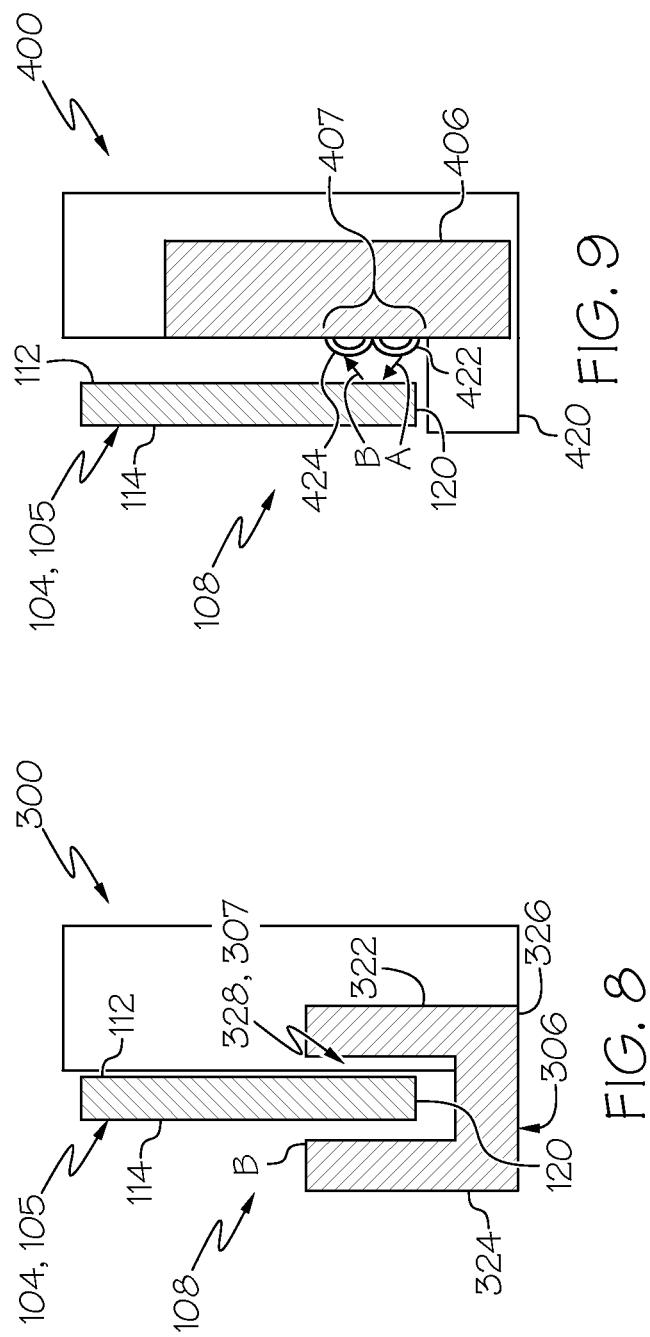

VEHICLE EMBLEM ALIGNMENT AND INSTALLATION TOOLS AND METHODS OF USE

TECHNICAL FIELD

The present specification generally relates to vehicle emblem alignment and installation tools, or jigs, to align and install vehicle emblems and, more specifically, to vehicle emblem alignment and installation tools to align and install vehicle emblems to vehicle surfaces and methods of use of such tools.

BACKGROUND

Vehicle designers typically plan installation of vehicle emblems at predetermined locations to give a certain prominence and look to the vehicle emblems. Conventional installation of vehicle emblems, or name badges, on surfaces of vehicles typically include manual and mechanical positioning mechanisms to align and install an emblem on a vehicle at a predetermined location and orientation.

Accordingly, a need exists for alternative vehicle alignment and installation tools to align and install vehicle emblems on vehicle surfaces such as trunk doors of vehicles in a reliable, repeatable fashion and methods of use of such vehicle alignment and installation tools.

SUMMARY

In one embodiment, an installation and alignment tool for alignment and installation of a vehicle emblem on a body panel assembly of a vehicle may include an outer handling side that faces an operator, an inner alignment side that faces the body panel assembly, a plurality of sensor assemblies including at least a first sensor assembly and a second sensor assembly, the first sensor assembly including a first vehicle panel detector aligned with a first axis, and the second sensor assembly including a second vehicle panel detector aligned with a second axis that is perpendicular to the first axis. The inner alignment side may include an inner facing surface and an emblem holding volume that is sized and shaped to receive the vehicle emblem therein, the inner alignment side may further include an alignment ridge extending outwardly therefrom that together with the inner facing surface defines a panel receiving volume. The first sensor assembly and the second sensor assembly may be arranged to concurrently provide an indication of alignment with the body panel assembly of the vehicle such that a datum surface of the body panel assembly is engaged by the alignment ridge in a predetermined orientation.

In another embodiment, a method for installation and alignment of a vehicle emblem on a body panel assembly of a vehicle may include placing a tool against an outer facing side of the body panel assembly. The tool may include an outer handling side that faces an operator, an inner alignment side that faces the body panel assembly, a plurality of sensor assemblies including at least a first sensor assembly and a second sensor assembly, the first sensor assembly including a first vehicle panel detector aligned with a first axis, and the second sensor assembly including a second vehicle panel detector aligned with a second axis that is perpendicular to the first axis. The inner alignment side may include an inner facing surface and an emblem holding volume that is sized and shaped to receive the vehicle emblem therein, the inner alignment side may further include an alignment ridge extending outwardly therefrom that together with the inner facing surface defines a panel receiving volume. The first sensor assembly and the second sensor assembly may be arranged to concurrently provide an indication of alignment with the body panel assembly of the vehicle such that a datum surface of the body panel assembly is engaged by the alignment ridge in a predetermined orientation. The method may further include moving the alignment ridge of the inner alignment side of the tool toward an alignment position in which the alignment ridge abuts and engages the datum surface of the body panel assembly in the predetermined orientation such that, when in the alignment position, the plurality of sensor assemblies and the circuit assembly activate a feedback mechanism.

In another embodiment, a method for installation and alignment of a vehicle emblem on a body panel assembly of a vehicle may include placing a tool against an outer facing side of the body panel assembly. The tool may include an outer handling side that faces an operator, an inner alignment side that faces the body panel assembly, a plurality of sensor assemblies including at least a first sensor assembly and a second sensor assembly, the first sensor assembly including a first vehicle panel detector aligned with a first axis, and the second sensor assembly including a second vehicle panel detector aligned with a second axis that is perpendicular to the first axis. The inner alignment side may include an inner facing surface and an emblem holding volume that is sized and shaped to receive the vehicle emblem therein, the inner alignment side may further include an alignment ridge extending outwardly therefrom that together with the inner facing surface defines a panel receiving volume. The first sensor assembly and the second sensor assembly may be arranged to concurrently provide an indication of alignment with the body panel assembly of the vehicle such that a datum surface of the body panel assembly is engaged by the alignment ridge in a predetermined orientation. The method may further include moving the alignment ridge of the inner alignment side of the tool toward an alignment position, activating a feedback mechanism with the alignment ridge of the tool in the alignment position, and upon activation of the feedback mechanism, applying a force to an emblem holder handle on the outer handling side aligned with the emblem holding volume to translate the emblem holder handle in a direction toward the body panel assembly to install the vehicle emblem onto the body panel assembly of the vehicle.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 7 schematically illustrates the vehicle emblem installation and alignment tool of FIG. 3 from inside the trunk door installed in a second aligned position on the bottom end portion of the open trunk door of FIG. 2, according to one or more embodiments shown and described herein;

FIG. 8 schematically illustrates a partial side view of another vehicle emblem installation and alignment tool, according to one or more embodiments shown and described herein; and FIG. 9 schematically illustrates a partial side view of yet another vehicle emblem installation and alignment tool, according to one or more embodiments shown and described herein.

DETAILED DESCRIPTION

Figure 3:
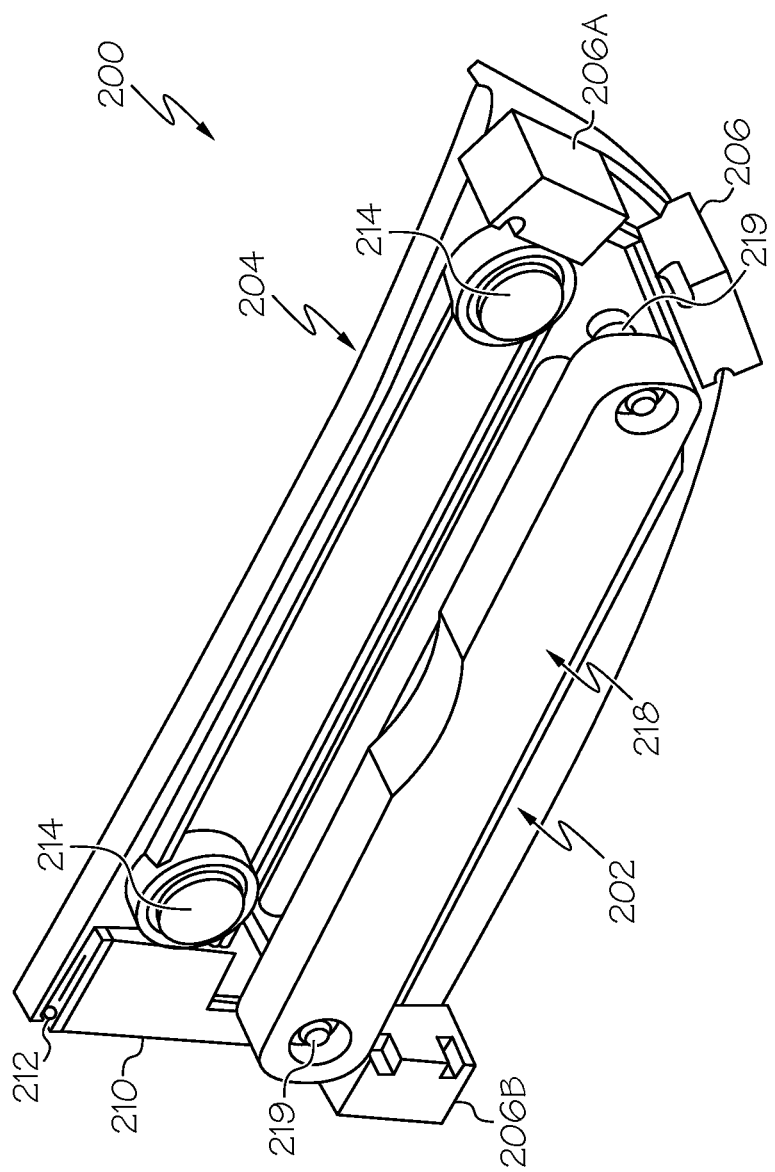
FIG. 3 schematically illustrates a perspective front view of a vehicle emblem installation and alignment tool, according to one or more embodiments shown and described herein.

Reference will now be made in detail to embodiments of vehicle emblem installation and alignment tools, examples of which are illustrated in the accompanying drawings. Whenever possible, the same reference numerals will be used throughout the drawings to refer to the same or like parts. One embodiment of a vehicle emblem installation and alignment tool is depicted in FIG. 3. While the vehicle emblem installation and alignment tool of FIG. 3 is illustrated to be applied against a bottom passenger side of a vehicle trunk door, a mirror image tool to be applied against a bottom driver side of the vehicle trunk door is within the scope of this disclosure. Further, the tool of FIG. 3 is meant to be formed with dimensions suitable for alignment and placement against a particular vehicle surface of a particular make and model of a vehicle and thus may differ in dimensional sizes and sensor placement points between vehicles of different makes and models and predetermined locations and orientations of the vehicle emblems on the makes and models. In embodiments, the vehicle emblem installation and alignment tool may include mechanical sensors such as switch-based sensors and/or automatic sensors such as photo-interrupter and/or photo-reflective sensors. The plurality of sensors on the vehicle emblem installation and alignment tool operate to, when concurrently activated, activate a feedback mechanism to indicate alignment of the vehicle emblem installation and alignment tool with a vehicle body panel assembly. Various embodiments of vehicle emblem installation and alignment tools will be described in further detail herein with specific reference to the appended drawings.

Figure 1:
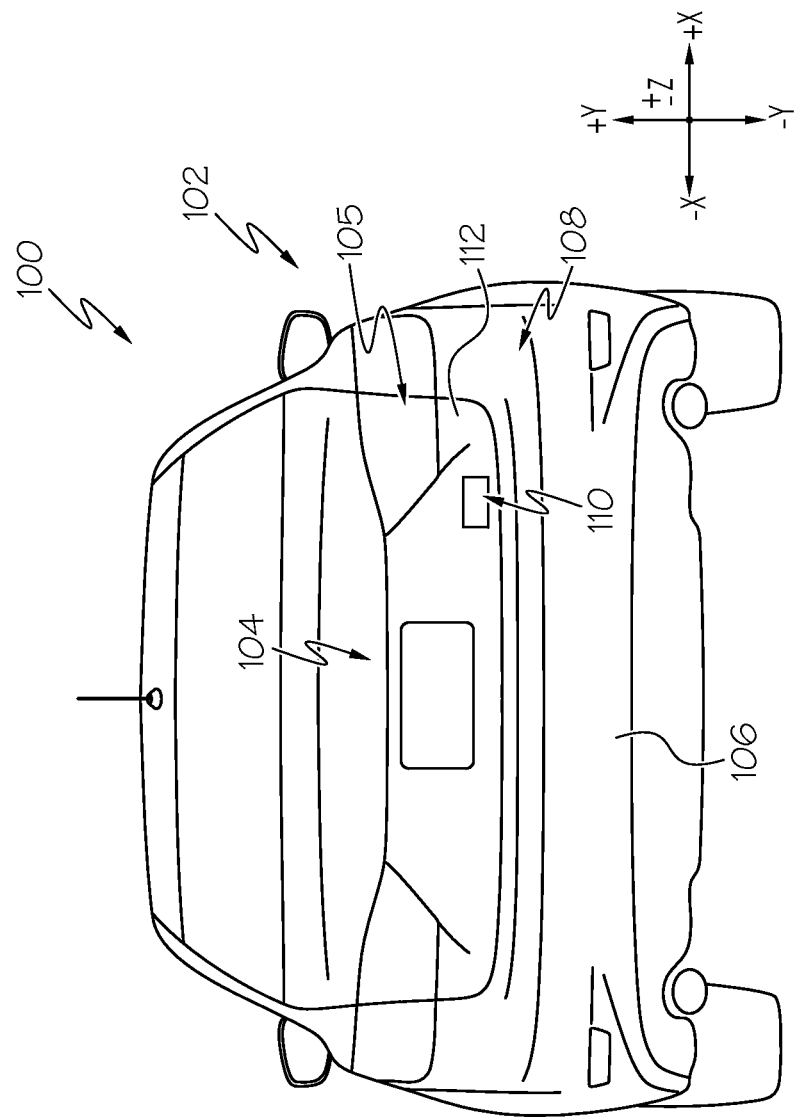
FIG. 1 schematically illustrates a rear end view of a vehicle with a trunk door in a closed position, according to one or more embodiments shown and described herein.

FIG. 1 generally depicts an embodiment of a vehicle 100. As described herein, a forward-rearward direction of the vehicle 100 is associated with the +/− vehicle Z-direction depicted in FIG. 1. A lateral direction of the vehicle 100 is associated with the +/− vehicle X-direction depicted in FIG. 1, and is transverse to the forward-rearward direction. An upward-downward direction of the vehicle 100 is associated with the +/− vehicle Y-direction depicted in FIG. 1. Further, the terms "inboard," "inward," "inner," "outboard," "outward," and "outer" are used to describe the relative positioning of various components of the vehicle and the vehicle emblem installation and alignment tool. Referring to FIG. 1, the terms "outboard" or "outward" or "outer" as used herein refer to a relative location of a component or the vehicle emblem installation and alignment tool in a positive (+) vehicle Z-direction facing away from a rear of the vehicle 100 and toward an operator. The terms "inboard" or "inward" or "inner" as used herein refer to a relative location of a component or the vehicle emblem installation and alignment tool in a negative (−) vehicle Z-direction facing toward a front of the vehicle 100.

Figure 2:
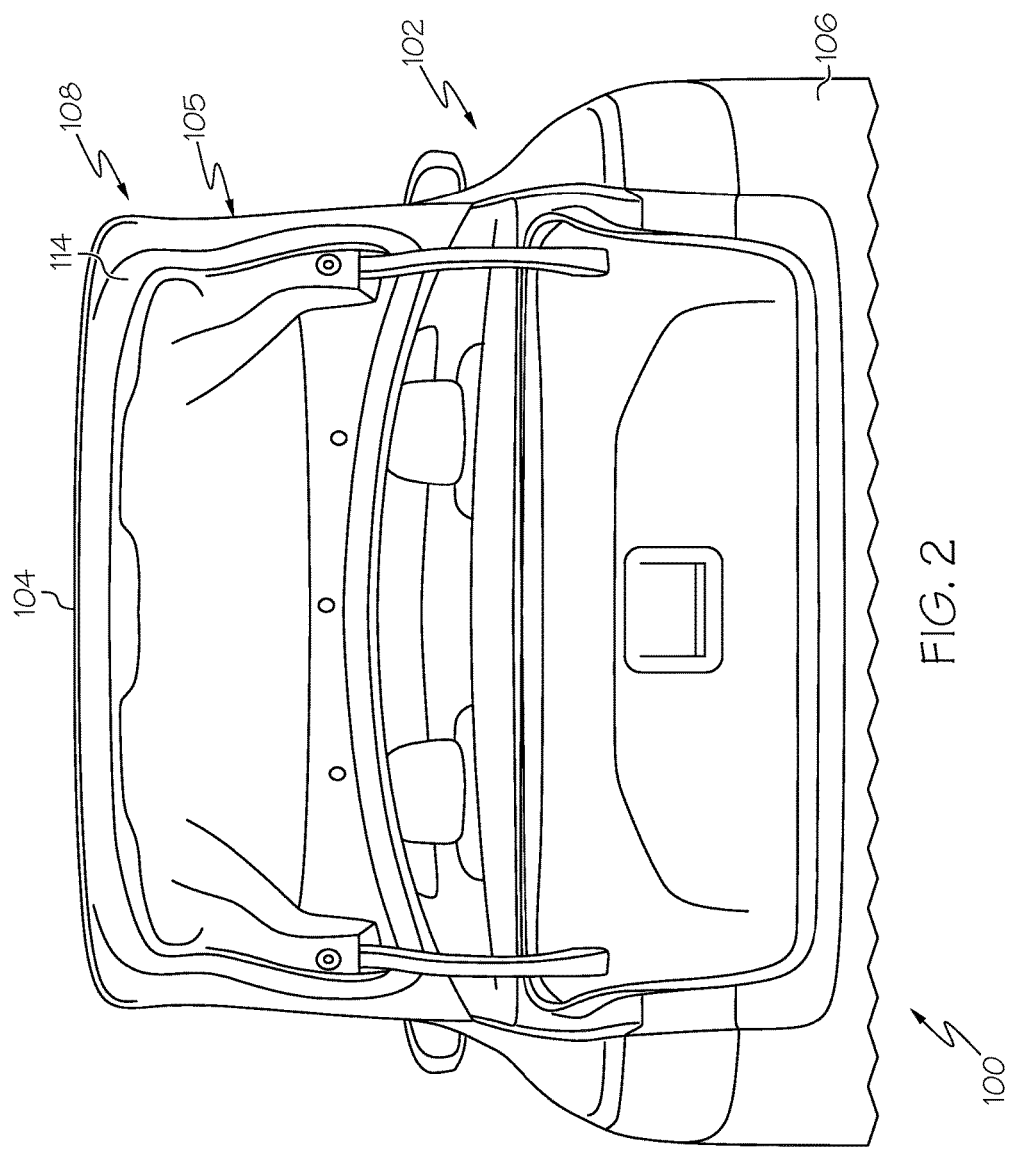
FIG. 2 schematically illustrates another rear end view of the vehicle of FIG. 1 with the trunk door in an open position, according to one or more embodiments shown and described herein.

The vehicle 100 includes a rear portion 102 including a body panel assembly 104 forming a part of a trunk door 105 of the vehicle 100 that has an outer facing side 112. FIG. 1 shows the body panel assembly 104 of the trunk door 105 is a closed position such that the body panel assembly 104 abuts and latches against a bumper portion 106 of the vehicle 100. The body panel assembly 104 includes a bottom, side end portion 108 against which a vehicle emblem 110 is disposed and installed in a predetermined location and orientation. FIG. 2 shows the body panel assembly 104 of the trunk door 105 in an open position in which a inner facing side 114 of the trunk door 105 of the vehicle 100 is visible.

Referring to FIG. 3, an embodiment of a vehicle emblem alignment and installation tool 200 (hereinafter, tool 200) for installation of the vehicle emblem 110 on the body panel assembly 104 of the vehicle 100 is shown. The tool 200 has an outer handling side 202 that faces an operator, and an inner alignment side 204 that faces the body panel assembly 104. The outer handling side 202 includes a plurality of sensor assemblies 206 such as a first sensor assembly 206A and a second sensor assembly 206B, a circuit assembly 210 that houses a feedback mechanism 212, and an emblem holder handle 218. The plurality of sensor assemblies 206, the circuit assembly 210, and the feedback mechanism 212 are electronically coupled to activate the feedback mechanism 212 when the plurality of sensor assemblies 206 are activated by an alignment of the tool 200 with the body panel assembly 104 of the vehicle 100.

The outer handling side 202 may further include a battery 211 (FIG. 5) such as a button cell battery. In embodiments, the battery 211 is electronically coupled to the circuit assembly 210. In embodiments, the battery 211 may be disposed within or outside of the circuit assembly 210. In embodiments, the outer handling side 202 may include one or more magnets 214 to hold the tool 200 against the outer facing side 112 of the trunk door 105 of the vehicle 100. In the illustrated example, the magnets 214 are aligned in the W direction and spaced apart from one another; however, any suitable arrangement can be used. The magnets 214 may be arranged and configured to magnetically engage the body panel assembly 104.

Figure 4:
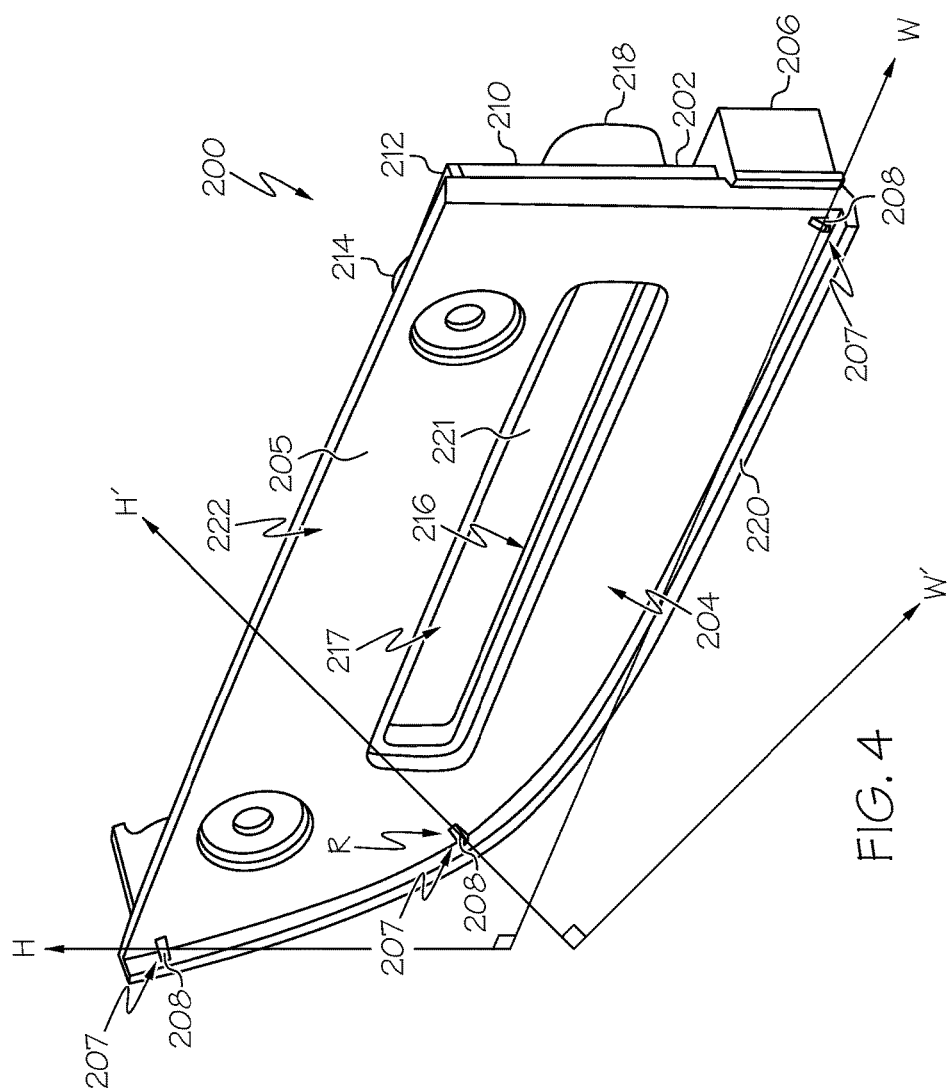
FIG. 4 schematically illustrates a perspective rear view of the vehicle emblem installation and alignment tool of FIG. 3, according to one or more embodiments shown and described herein.

Referring to FIG. 4, the inner alignment side 204 includes an inner facing surface 205 and an emblem holding volume 216 that is sized and shaped to receive the vehicle emblem 110 therein. The emblem holding volume 216 is defined by a recess 217 in the inner facing surface 205 and an emblem pusher member 221 movably positioned in the recess 217 that moves toward the inner facing surface 205 by pressing the emblem holder handle 218 toward the inner alignment side 204. The inner alignment side 204 further includes an alignment ridge 220 extending outwardly therefrom that together with the inner facing surface 205 defines a panel receiving volume 222. The alignment ridge 220 is disposed outboard of the emblem holding volume 216 and is shaped to follow a contour of an edge of the body panel assembly 104. The emblem holder handle 218 is aligned with the emblem holding volume 216 on the inner alignment side 204.

One or more spring assemblies 219, described in greater detail further below, are attached to the emblem holder handle 218 to allow translation of the emblem holder handle 218 to cause a forward movement of the emblem pusher member 221 toward the inner facing surface 205. The spring assemblies 219 may be made of steel springs, though other types of biasing assemblies and/or materials are within the scope of this disclosure.

The first sensor assembly 206A includes a vehicle panel detector 207 aligned with a first axis, such as axis H of FIG. 4. The second sensor assembly 206 B includes a vehicle panel detector 207 aligned with a second axis, such as axis W of FIG. 4, that is perpendicular to the first axis. A third sensor assembly may include a vehicle panel detector 207 aligned with a third axis, such as axis H' that is perpendicular to an axis W'. The third axis H' is rotated away from the first axis H and disposed between the first axis H and the second axis W, and the third sensor assembly is disposed at a rotation point R along the third axis W'. While three points are described with respective to FIG. 4, the plurality of sensor assemblies 206 are provided such that a concurrent activation of the respective sensor assemblies 206 at a respective point by an edge-detection of the body panel assembly 104 causes an activation of the feedback mechanism 212.

In embodiments, each vehicle panel detector 207 may include a body panel feeler 208 on the inner alignment side 204 of the tool 200. Each body panel feeler 208 may be respectively coupled to a sensor assembly 206. A datum surface 120 (FIG. 7) of the body panel assembly 104 provides another contact point for providing a reliable alignment of the tool 200 with the body panel assembly 104. For example, alignment of the datum surface 120 of the body panel assembly 104 with the alignment ridge 220 of the inner alignment side 204 of the tool 200 will provide a force on the plurality of body panel feelers 208 to cause them to activate a respective one of the sensor assemblies 206, such that when all of the plurality of sensor assemblies 206 are activated, the feedback mechanism 212 itself is activated. In embodiments, the first sensor assembly 206A and the second sensor assembly 206B are arranged to concurrently provide an indication of alignment with the body panel assembly 104 of the vehicle 100 such that the datum surface 120 of the body panel assembly 104 is engaged by the alignment ridge 220 in a predetermined orientation.

The tool 200 along with components of the tool 200 as described herein may be made of a polycarbonate base material or nylon, and the plurality of sensor assemblies 206 may be covered by a housing made of nylon, for example. As a non-limiting example, the vehicle emblem 110 may include a chrome finish.

In embodiments, the plurality of sensor assemblies 206 may include mechanically activated sensors. As an example and not a limitation, as described above, the inner alignment side 204 may include the plurality of body panel feelers 208 (FIGS. 4 and 6) respectively coupled to the plurality of sensor assemblies 206, wherein alignment of the datum surface 120 (FIG. 7) of the body panel assembly 104 with the alignment ridge 220 of the inner alignment side 204 of the tool 200 will provide a force on the plurality of body panel feelers 208. This provided force will cause the plurality of body panel feelers 208 to press against and activate a respective one of the plurality of sensor assemblies 206. When all of the plurality of sensor assemblies 206 are activated concurrently, the feedback mechanism 212 is activated. The body panel feelers 208 may be made of a polycarbonate base material or nylon, for example.

In embodiments, the feedback mechanism 212 includes at least one of haptic feedback, visual feedback, and audible feedback. The feedback mechanism may be, as a non-limiting example, a light emitting diode ("LED"), and activation of the feedback mechanism may cause an illumination of the LED.

Figure 5:
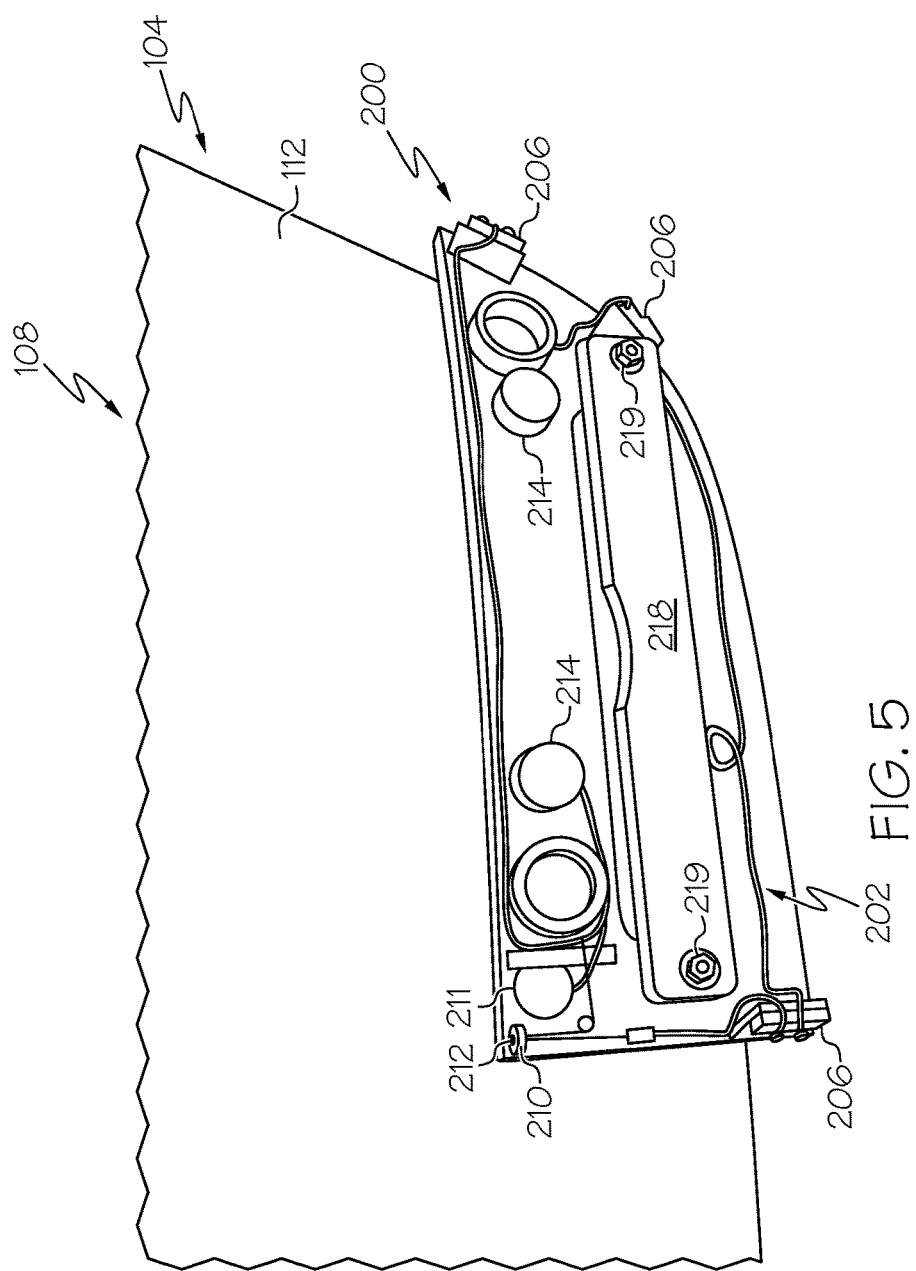
FIG. 5 schematically illustrates the vehicle emblem installation and alignment tool of FIG. 3 from outside the trunk door installed on a bottom end portion of the open trunk door of FIG. 2, according to one or more embodiments shown and described herein.

In embodiments, a method for installation and alignment of an emblem on a body panel assembly of a vehicle includes disposing the vehicle emblem 110 in the emblem holding volume 216 in the inner alignment side 204 of the tool 200. As shown in FIG. 5, the inner alignment side 204 of the tool 200 may be placed against the outer facing side 112 of the body panel assembly 104. The tool 200 of FIG. 5 shows the plurality of sensor assemblies 206, the circuit assembly 210, and the feedback mechanism 212 electronically coupled in series, though other types of circuit arrangements (such as a circuit coupled in parallel) are within the scope of this disclosure.

Figure 6:
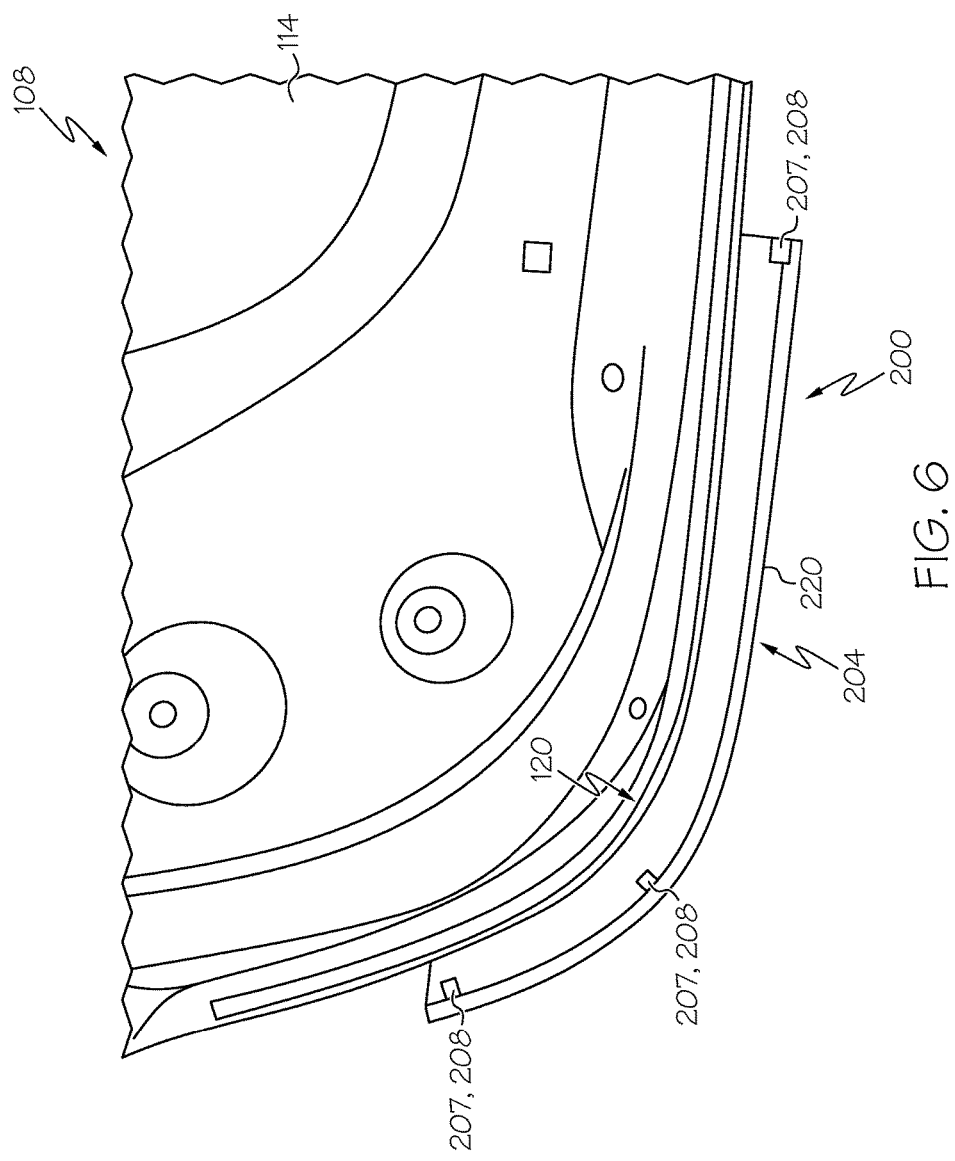
FIG. 6 schematically illustrates the vehicle emblem installation and alignment tool of FIG. 3 from inside the trunk door being installed in a first misaligned position on the bottom end portion of the open trunk door of FIG. 2, according to one or more embodiments shown and described herein.

As shown in FIGS. 6-7, the alignment ridge 220 of the inner alignment side 204 of the tool 200 may be moved from a first misaligned position (in FIG. 6) toward an aligned position (FIG. 7) in which the alignment ridge 220 abuts the datum surface 120 of the body panel assembly 104 engaged by the alignment ridge 220 in a predetermined orientation. In the misaligned position, at least one of the body panel feelers 208 is out of contact with the alignment ridge 220. When in the aligned position, the electronically coupled plurality of sensor assemblies 206 and circuit assembly 210 activate the feedback mechanism 212 with all of the body panel feelers 208 in contact with the alignment ridge 220. The method may further include, upon activation of the feedback mechanism 212, applying a force to the emblem holder handle 218 to push and move the emblem pusher member 221 toward the inner facing surface 205 to install the vehicle emblem 110 on the body panel assembly 104 of the vehicle 100.

In some embodiments, the tool 200 may further include a locking mechanism that locks the emblem holder handle 218 in an extended, non-pushed positioned until the feedback mechanism 212 is activated. Activation of the feedback mechanism 212 may then cause for a lock release of the locking mechanism to allow for the emblem holder handle 218 to advance toward the body panel assembly 104 of the vehicle 100 and to install the vehicle emblem 110 on the outer facing side 112 of the body panel assembly 104.

While the method described above to use the tool 200 is manually performed, in some embodiments, the above steps may be performed robotically such as, for example, by use of one or more robotic arms. A system including the one or more robotic arms may also include a processor communicatively coupled to a non-transitory computer storage medium that stores instructions that, when executed by the processor, cause the processor to instruct the one or more robotic arms to perform the steps to use the tool 200 (or similarly tools 300 and 400 as describe in greater detail below) as described herein.

The pair of spring assemblies 219 illustrated by FIG. 3 may be attached to the emblem holder handle 218 such that the emblem holder handle 218 is translatable as a result of an applied force on the emblem holder handle 218. For example, the emblem holder handle 218 may be biased outward with spring assemblies 219. Pressure on the spring assemblies 219 may first set a center point of the vehicle emblem 110 on the outer facing side 112 of the body panel assembly 104, with outer points of the vehicle emblem 110 bowed away from the center point. As one example, a length of the emblem holding volume 216 may be slightly shorter than a length of the vehicle emblem 110 to cause bowing of the center of the vehicle emblem 110 outward. Advancing the emblem holder handle 218 may then press the outer points of the vehicle emblem 110 onto the body panel assembly 104 of the vehicle 100 which can more reliably secure an adhesive engagement between the body panel assembly 104 and the vehicle emblem 110. The vehicle emblem 110 may be coated with an adhesive behind the removed protective adhesive tape, that allows the vehicle emblem 110 to adhere to the outer facing side 112 of the body panel assembly 104 of the vehicle 100. When the compressive force is release from the emblem holder handle 218, the emblem holder handle 218 is biased away from the vehicle body panel assembly 104 via the spring assembly 219 and releases and the vehicle emblem 110 such that the vehicle emblem 110 is installed on the outer facing side 112 of the body panel assembly 104.

In some embodiments, the plurality of sensor assemblies 206 may include photo-interrupter sensor assemblies (FIG. 8) and/or photo-reflective sensor assemblies (FIG. 9). Referring to FIG. 8, in an embodiment, a tool 300 is similar to tool 200 except that it includes at least one photo-interrupter sensor assembly 306 in place of or as at least one respective sensor assembly 206. Each photo-interrupter sensor assembly 306 includes an outer handling end sidewall 322, an inner alignment end sidewall 324, and a joining wall 326 disposed between the outer handling end and inner alignment end sidewalls 322, 324. A vehicle panel detector 307 includes a slot 328 that is defined by the outer handling end sidewall 322, the inner alignment end sidewall 324, and the joining wall 326. Interruption of the slot 328 by the body panel assembly 104 will activate the respective photo-interrupter sensor assembly 306 such that activation of the plurality of sensor assemblies 206, 306 will activate the feedback mechanism 212. A photo-interrupter sensor assembly 306 may include a transmission type photosensor that integrates optical receiving and transmitting elements. For example, a single phototransistor and photo integrated chip ("IC") may be integrated for light detection, and a long life GaAs infrared photodiode may be utilized for output (such as when light blocking, or an interruption of light detection, is detected). As a non-limiting example, the datum surface 120 may include a vehicle hem line of about 3 mm adjacent a vehicle sealer bead, such that a total width maybe about 4.25 mm for the datum surface 120. The slot 328 of the photo-interrupter sensor assembly 306 may then be in at least 5 mm to accommodate the width of the datum surface 120.

Referring to FIG. 9, in an embodiment, a tool 400 is similar to tool 200 except that it includes at least one photo-reflective sensor assembly 406 in place of or as at least one respective sensor assembly 206. Each photo-reflective sensor assembly 406 includes a sensor emitter 422 and a sensor receiver 424. Detection of the body panel assembly 104 by the sensor emitter 422 and the sensor receiver 424 (by detection paths following arrows A and B to sense the presence of the body panel assembly 104) will activate the respective photo-reflective sensor assembly 406 such that activation of the plurality of sensor assemblies 206, 306 will activate the feedback mechanism 212. A photo-reflective sensor assembly 406 senses the presence of the body panel assembly 104 within a detecting range or field of view photo-reflective sensor assembly 406. For example, the sensor emitter 422 emits a transmitter signal in the direction of arrow A and that is reflected back from the body panel assembly 104 that is in the detecting range and toward the sensor receiver 424 along the direction of arrow B such that the transmitter signal is received by the sensor receiver 424. It is to be understood that while mechanical switch activated sensors, photo-interrupter sensors, and photo-reflective sensors have been described in embodiments, herein, other types of sensors to detect the presence of the body panel assembly 104 are within the scope of this disclosure.

It is noted that the terms "substantially" and "about" and "approximately" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. An installation and alignment tool for alignment and installation of a vehicle emblem on a body panel assembly of a vehicle, the tool comprising:
   an outer handling side that is configured to face away from the body panel assembly;
   an inner alignment side that is configured to face the body panel assembly, the inner alignment side comprising an inner facing surface and an emblem holding volume that is sized and shaped to receive the vehicle emblem therein, the inner alignment side further includes an alignment ridge extending outwardly therefrom that together with the inner facing surface defines a panel receiving volume sized and shaped to receive a portion of the body panel assembly therein, wherein the alignment ridge protrudes from a curved outer edge of the inner facing surface, extends between a first end and a second end of the curved outer edge of the inner facing surface, and comprises a radius of curvature along the curved outer edge of the inner facing surface between the first end and the second end;
   a plurality of sensor assemblies comprising at least a first sensor assembly and a second sensor assembly;
   the first sensor assembly comprising a first vehicle panel detector configured to detect receipt of the portion of the body panel assembly, the first vehicle panel detector aligned with a first axis; and
   the second sensor assembly comprising a second vehicle panel detector configured to detect receipt of the portion of the body panel assembly, the second vehicle panel detector aligned with a second axis that is perpendicular to the first axis;

the first sensor assembly and the second sensor assembly are arranged to concurrently provide an indication of alignment with the body panel assembly of the vehicle such that a datum surface of the body panel assembly is engaged by the alignment ridge in a predetermined orientation.

2. The tool of claim 1, wherein the outer handling side comprises a feedback mechanism that is electronically coupled to the plurality of sensor assemblies to activate the feedback mechanism when the plurality of sensor assemblies are activated by alignment of the alignment ridge with the datum surface of the body panel assembly.

3. The tool of claim 2, wherein a pair of spring assemblies are attached to an emblem holder handle on the outer handling side aligned with the emblem holding volume such that the emblem holder handle is translatable as a result of an applied force on the emblem holder handle.

4. The tool of claim 2, further comprising a battery electronically coupled to the feedback mechanism and the plurality of sensor assemblies.

5. The tool of claim 2, the outer handling side further including one or more magnets arranged and configured to magnetically engage the body panel assembly.

6. The tool of claim 2, wherein each vehicle panel detector comprises a body panel feeler on the inner alignment side and each body panel feeler is respectively coupled to a sensor assembly, the body panel feeler of the first sensor assembly being aligned with the first axis and the body panel feeler of the second sensor assembly being aligned with the second axis, wherein alignment of the datum surface of the body panel assembly with the alignment ridge of the inner alignment side of the tool will provide a force on each body panel feeler to cause each body panel feeler to activate a respective one of the sensor assemblies, such that when all of the plurality of sensor assemblies are concurrently activated, the feedback mechanism is activated.

7. The tool of claim 2, the feedback mechanism comprising at least one of haptic feedback, visual feedback, and audible feedback.

8. The tool of claim 7, wherein the feedback mechanism is an LED, and wherein activation of the feedback mechanism comprises illumination of the LED.

9. The tool of claim 1, wherein the plurality of sensor assemblies comprises photo-interrupter sensor assemblies.

10. The tool of claim 9, wherein each photo-interrupter sensor assembly comprises a outer handling end sidewall, an inner alignment end sidewall, a joining wall disposed between the outer handling end and the inner alignment end sidewalls, and a slot defined by the outer handling end sidewall, the inner alignment end sidewall, and the joining wall, wherein at least one of the vehicle panel detectors comprises the slot and interruption of the slot by the body panel assembly will activate the respective photo-interrupter sensor assembly.

11. The tool of claim 1, wherein the plurality of sensor assemblies comprises photo-reflective sensor assembly.

12. The tool of claim 11, wherein each photo-reflective sensor assembly comprises a sensor emitter and a sensor receiver, wherein at least one of the vehicle panel detectors comprises the sensor emitter and the sensor receiver such that detection of the body panel assembly by the sensor emitter and the sensor receiver will activate the respective photo-reflective sensor assembly.

13. The tool of claim 1, further comprising a third sensor assembly comprising a vehicle panel detector aligned with a third axis.

14. The tool of claim 13, wherein the third axis is rotated away from the first axis and disposed between the first axis and the second axis, and the third sensor assembly is disposed at a rotation point along the third axis.

* * * * *